United States Patent [19]

Tooley et al.

[11] Patent Number: 4,971,608

[45] Date of Patent: Nov. 20, 1990

[54] SORPTION AND DETECTION OF TRIALKYL ARSINES

[75] Inventors: Patricia A. Tooley; Gerhard P. Nowack, both of Bartlesville, Okla.

[73] Assignee: Phillips Petroleum Company, Bartlesville, Okla.

[21] Appl. No.: 446,238

[22] Filed: Dec. 5, 1989

[51] Int. Cl.$^5$ .............................................. B01D 53/04
[52] U.S. Cl. ........................................ 55/72; 55/73; 55/74
[58] Field of Search ................ 55/68, 72–75, 55/77–79, 274, 387, 389, 390; 423/210, 245.1, 617; 556/64

[56] References Cited

U.S. PATENT DOCUMENTS

| | | | |
|---|---|---|---|
| 3,112,998 | 12/1963 | Grosskopf | 23/254 |
| 3,789,581 | 2/1974 | Carr et al. | 55/73 |
| 3,812,652 | 5/1974 | Carr et al. | 55/68 |
| 3,812,653 | 5/1974 | Massoth et al. | 55/68 |
| 4,230,457 | 10/1980 | Leichnitz | 23/232 R |
| 4,420,567 | 12/1983 | McMahon et al. | 436/169 |
| 4,578,256 | 3/1986 | Nishino et al. | 55/72 X |
| 4,593,148 | 6/1986 | Johnson et al. | 423/210 X |
| 4,605,812 | 8/1986 | Nowack et al. | 423/210 X |
| 4,708,853 | 11/1987 | Matviya et al. | 55/75 X |
| 4,744,221 | 5/1988 | Knollmueller | 55/74 X |
| 4,869,735 | 9/1989 | Miyazawa et al. | 55/72 |
| 4,892,567 | 1/1990 | Yan | 55/72 X |

FOREIGN PATENT DOCUMENTS

| | | | |
|---|---|---|---|
| 2654634 | 6/1977 | Fed. Rep. of Germany | 55/68 |
| 63-036835 | 2/1988 | Japan | 423/210 |
| 0707592 | 1/1980 | U.S.S.R. | 55/74 |

*Primary Examiner*—Robert Spitzer
*Attorney, Agent, or Firm*—K. K. Brandes

[57] ABSTRACT

Trialkyl arsines are removed from fluids, in particular gases, by contacting with a solid sorbent material containing at least one gold component (preferably AuCl and/or AuCl$_3$ and/or NH$_4$AuCl$_4$) and a support material (preferably alumina and/or silica). This process can be used for colorimetrically detecting the presence of arsines in gases.

21 Claims, No Drawings

SORPTION AND DETECTION OF TRIALKYL ARSINES

BACKGROUND OF THE INVENTION

This invention relates to the removal of trialkyl arsines from fluids by means of solid sorbents. In another aspect, this invention relates to the removal of trialkyl arsines from gases, in particular hydrocarbon-containing gases. In a further aspect, this invention is directed to a method of detecting the presence of trialkyl arsines in gases.

Materials for adsorbing and/or absorbing and detecting unsubstituted arsine ($AsH_3$) are well known. However, many of these materials are ineffective for the sorption of trialkyl arsines, which may be present as undesirable impurities in natural gas streams produced at some well sites. This invention provides sorbent materials which are quite effective in removing trialkyl arsines from fluids, in particular gases, by sorption (i.e., adsorption and/or absorption).

SUMMARY OF THE INVENTION

It is an object of this invention to provide a process for removing trialkyl arsines from fluids. It is another object of this invention to provide a process for removing trialkyl arsines from gases, in particular hydrocarbon-containing gases. It is another object of this invention to provide a method of indicating the presence of small amounts of trialkyl arsines in gases. Other objects will become apparent from the detailed description of the invention and the appended claims.

In accordance with this invention, a process for at least partially removing trialkyl arsines from fluids (preferably gases) comprises the step of contacting a fluid feed which contains at least one trialkyl arsine with a solid sorbent material comprising (preferably consisting essentially of) (a) at least one gold component and (b) an inorganic support material (preferably alumina or silica or mixtures thereof); wherein said contacting is carried out at such contacting conditions as to obtain a fluid product having a lower trialkyl arsine content than said feed, and to obtain a used sorbent material containing that portion of said at least one trialkyl arsine which has been removed from the feed.

DETAILED DESCRIPTION OF THE INVENTION

The term "trialkyl arsine", as used herein, refers to compounds having the general chemical formula of $R_3As$, wherein each R is a radical independently selected from among alkyl groups (straight and/or branched), preferably having 1-6 (more preferably 1-3) carbon atoms per molecule. Particularly preferred trialkyl arsines are trimethyl arsine, triethyl arsine, dimethyl ethyl arsine and diethyl methyl arsine.

Any suitable liquid or gaseous fluid stream which contains trialkyl arsine(s) can be used as feed in the process of this invention. Preferably, the feed is gaseous. Non-limiting examples of suitable feeds are: natural gas; gaseous petroleum fractions comprising paraffins and olefins containing 1-6 carbon atoms per molecule; and gaseous products from thermal and catalytic cracking of petroleum, shale oil or coal. Generally, the gases comprise methane, ethane, ethylene, propane, propylene, n-butane, isobutane, butenes and the like. These gas streams can contain other impurities, such as hydrogen sulfide, carbonyl sulfide (COS), mercaptans, organic sulfides, carbon monoxide, carbon dioxide, inert gases ($N_2$, He, Ne, Ar), and the like. Other arsenic compounds may also be present in the fluid stream which is treated by the process of this invention, such as $AsH_3$, $RAsH_2$, $R_2AsH$, $R_3AsO$ (trialkyl arsine oxides), $R_3AsS$ (trialkyl arsine sulfides), and the like; wherein R is an alkyl group, as defined above. It is also possible to have triphenyl arsine, dialkyl phenyl arsines, dialkyl cycloalkyl arsines, and the like present in the feed. Preferably, free oxygen is substantially absent from the feed.

Generally, the total concentration of the trialkyl arsine(s) in the feed (preferably gaseous) is in the range of from about 1 ppb (1 part by weight of trialkyl arsine per billion parts by weight of feed) to about 0.1 weight-%, preferably about 0.1–100 ppm (parts by weight trialkyl arsine per million parts by weight of feed). The concentrations of the other impurities and the exact composition of the feed will widely vary from feedstock to feedstock.

The sorbent materials which are used in the process of this invention comprise at least one gold component and a support material onto which the gold component is deposited. Non-limiting examples of the gold component are gold metal, gold oxides ($Au_2O$, $Au_2O_3$), Au(III) nitrate, Au(III) sulfate, Au(I) chloride, Au(III) chloride, $NH_4AuCl_4$, Au(III) carboxylates (e.g., acetate); preferably $AuCl$ or $AuCl_3$ or $NH_4AuCl_4$ or mixtures thereof. Generally the gold content in the sorbent is in the range of from about 0.1 to about 25, preferably from about 0.5 to about 15, weight-% Au.

Any suitable inorganic support material can be employed. Non-limiting examples of such support materials are alumina, fluorided alumina, aluminum phosphate, silica, fluorided silica, aluminosilicates (clays, zeolites), titania ($TiO_2$), zirconia ($ZrO_2$), hafnia ($HfO_2$), zinc aluminate ($ZnAl_2O_4$), aluminates of alkaline earth metals (i.e., Be, Mg, Ca, Sr, Ba), zinc titanate ($Zn_2TiO_4$), titanates of alkaline earth metals, activated carbon, and mixtures of two or more than two of the above compounds. Presently preferred support materials are alumina, silica, and mixtures of alumina and silica. The term "fluorided" means that the support material (alumina or silica) has been treated with a fluoriding compound, preferably HF or $NH_4HF_2$, under such conditions as to incorporate fluoride ions into the crystal lattice of alumina or silica.

The sorbent particles can have any suitable surface area (such as about 10–500 $m^2/g$, as measured by the B.E.T. method employing $N_2$), any suitable shape (spherical, cylindrical, ring-shaped, trilobal etc.), and any suitable size (such as about 1–20 mm diameter for spherical particles).

Any suitable contacting conditions can be employed in the sorption process of this invention. Generally the temperature in the contacting zone is in the range of from about −20° to about 100° C., preferably about 20° to about 50° C. Generally the pressure in the contacting zone is in the range of from about 1 to about 500 atm., preferably about 1 to about 70 atm. Generally the gas hourly space velocity of the gaseous feed in the contacting zone is in the range of from about 1 to about 10,000 volume of feed/volume of sorbent/hour, preferably about 1,000 to about 3,000 volume/volume/hour, measured at about 25° C./1 atm. Generally the contacting is continued until trialkyl arsine breakthrough occurs, i.e., when the treated product contains more trialkyl arsines than can be tolerated, such as about 50 ppb.

Treatment of the feed streams in accordance with the process of this invention can be carried out in any suitable manner. For example, in a preferred embodiment a bed of the sorbent is placed as a fixed bed in a confined zone, and a fluid stream (preferably a gas) is passed therethrough in either upward or downward flow. Other suitable, yet less preferred methods of treatment can include a fluidized operation in which the feed and the sorbent particles are maintained in a state of turbulence under hindered settling conditions in a confined zone, moving bed operations in which the sorbent passes as a moving bed concurrently to or concurrently with the feed, etc. In a fixed bed operation of a continuous process, the flow of fluid can be rotated between two or more sorbent beds with at least one being in regular operation, the other being in a regeneration mode. Continuous processes are preferred, but it is understood that batch type operations can be employed when desired.

It is within the scope of this invention to employ a combination of sorbents, such as a first bed of PbO/Al$_2$O$_3$ (described in U.S. Pat. No. 3,789,581) or of a CuO/ZnO- containing material (described in U.S. Pat. No. 4,593,148) as guard bed material for removal of a major portion of AsH$_3$ or H$_2$S or both, and at least one subsequent downstream bed containing at least one of the sorbent materials of this invention for absorbing primarily trialkyl arsines. This multi-bed operation can be carried out in one reactor containing a layer of PbO/Al$_2$O$_3$ or CuO/ZnO material (or any other known sorbent for AsH$_3$ and/or H$_2$S) and a downstream layer of a trialkyl arsine sorbent of this invention. Or the multi-bed operation can be carried out using two or more separate sorption reactors: at least one first reactor containing PbO/Al$_2$O$_3$ or CuO/ZnO material (or any other known sorbent for AsH$_3$ and/or H$_2$S) and at least one second reactor containing the trialkyl arsine sorbent of this invention, wherein the feed passes through the first reactor(s) and thereafter through the second reactor(s).

In a particular application, this process of this invention is used for detecting the presence of trialkyl arsines in gases. The supported sorbent material of this invention is placed into a small detector tube (commonly referred to as "Draeger tube", described in U.S. Pat. No. 3,112,998) through which a gas stream containing small amounts of trialkyl arsine(s) of about 1 ppb to about 0.1 weight % trialkyl arsine, preferably about 0.1-100 ppm trialkyl arsine, is passed. Preferably, the gas stream which generally also contains H$_2$S is first passed through a tube containing an effective H$_2$S sorbent (such as PbO on alumina or a CuO/ZnO containing material) as guard bed material so as to remove essentially all H$_2$S therefrom. When the gas stream, which contains AsR$_3$ and is essentially free of H$_2$S, is contacted with the sorbent material of this invention (preferably silica- or alumina- supported Au(III) compound), the color of the sorbent material changes from a yellowish color (yellow-green or yellow-orange) to violet-gray. The lower detection limit of this colorimetric method is about 1 ppb As.

The process of this invention will be further illustrated by the following non-limiting examples.

Example I

This example illustrates the preparation of trialkyl arsine sorbent materials.

Sorbent A was an alumina-supported gold chloride material containing about 5 weight-% Au. Sorbent A was prepared by impregnating 10 grams of 20-40 mesh Al$_2$O$_3$ (BET/N$_2$ surface area: 207 m$^2$/g; provided by Kaiser Tech Limited, a division of Maxxam Group, Cleveland, Ohio, under the product designation "S-201") with a solution of 0.91 grams of NH$_4$AuCl$_4$·xH$_2$O (formula weight:357) in 7 cc of distilled water. The obtained yellow-orange colored, solid material was dried in air for 7 hours at 70° C., and was then heated in air for 1 hour at 200° C.

Sorbent B was a silica-supported gold chloride material containing about 5 weight-% Au. Sorbent B was prepared by impregnating 10 grams of 20-40 mesh SiO$_2$ (estimated BET/N$_2$ surface area: greater than 50 m$^2$/g; provided by Calsicat Division of Mallinckrodt, Inc., Erie, Pa.), which had previously been calcined at 500° C., with a solution of 0.91 grams of NH$_4$AuCl$_4$·xH$_2$O in 10 cc of distilled water. The obtained yellow-green colored, solid material was dried in air for 7 hours at 70° C. and then heated in air for 1 hour at 200° C.

Sorbent C was a titania-supported gold chloride material containing about 5 weight-% Au. Sorbent C was prepared by impregnating 8.7 grams of 20-40 mesh TiO$_2$ (BET/N$_2$ surface area: 44 m$^2$/g; provided by Calsicat), which had previously been hydrotreated for removal of sulfur impurities, was impregnated with a solution of 0.79 g NH$_4$AuCl$_4$·xH$_2$O in 6 cc of distilled water. The obtained dark gray material was dried and heated in air as described for Sorbents A and B.

Example II

This example illustrates the absorption of an alkyl arsine by the gold-containing sorbent materials described in Example I.

A nitrogen gas stream was passed through a flask containing liquid trimethyl arsine (provided by Strem Chemicals, Inc.), which was cooled to about −78° C. by placing the flask in a dry ice/acetone mixture. The exiting gas stream, which consisted essentially of N$_2$ and trimethyl arsine, was passed through a glass tube of about 7 mm diameter and about 12 cm length containing about 1 gram of one of the sorbents described in Example I. The flow rate of the feed gas was about 1800 cc/hour. The gas which exited the absorption tube was passed through an aqueous solution of KMnO$_4$ and then to a flow meter.

When trimethyl arsine breakthrough occurred (i.e., when the sorbent had reached its maximum trialkyl arsine absorption capacity), the purple color of the KMnO$_4$ solution turned brownish. After arsine breakthrough had been detected, the flow of the trimethyl arsine containing gas stream was stopped. Then a purge stream of pure nitrogen was passed through the sorbent material (with the exception of Sorbent C) until a constant weight of the absorption tube containing the sorbent and absorbed trimethyl arsine was attained. The difference between this weight and the initial weight of the tube with fresh sorbent was the weight of absorbed trimethyl arsine. Test results are summarized in Table I.

TABLE I

| Sorbent | Millimoles (CH$_3$)$_3$ As Per Gram Sorbent[1] |
|---|---|
| A | 0.196 |
| B | 0.227 |

TABLE I-continued

| Sorbent | Millimoles (CH$_3$)$_3$ As Per Gram Sorbent[1] |
|---|---|
| C | 0.049[2] |

[1] at trimethyl arsine breakthrough
[2] not purged with N$_2$ to constant weight Test data in Table I indicate that the three tested gold-promoted sorbent materials were effective in absorbing trimethyl arsine. The silica-supported gold chloride material (Sorbent B) and the alumina-supported gold chloride material (Sorbent A) were particularly effective, and are considered the preferred sorbents in the process of this invention. Additional tests revealed that the three unpromoted support materials (i.e. Al$_2$O$_3$, SiO$_2$, TiO$_2$ without gold chloride) did not absorb any trimethyl arsine.

Example III

This example illustrates the use of a supported gold chloride sorbent as visual indicator for the presence of trialkyl arsines in gases.

A natural gas stream containing trialkyl arsine(s) is passed through a Draeger tube containing a front layer of a sulfur sorbent, preferably PbO/Al$_2$O$_3$, and a subsequent layer of Sorbent A or Sorbent B (described in Example I). The yellow-orange or yellow-green color of Sorbent A or B will turn to violet gray when exposed to the trialkyl arsine(s).

Reasonable variations and modifications are possible within the scope of the disclosure and appended claims.

That which is claimed is:

1. A process for removing trialkyl arsines from fluids comprising the step of contacting a fluid feed which contains at least one trialkyl arsine with s solid sorbent material comprising (a) at least one gold component and (b) an inorganic support material; wherein said contacting is carried out at such contacting conditions as to obtain a fluid product having a lower trialkyl arsine content than said feed, and to obtain a used solid sorbent material containing that portion of said at least one trialkyl arsine which has been removed from said feed.

2. A process in accordance with claim 1, wherein said fluid is a gas.

3. A process in accordance with claim 1, wherein said fluid is a hydrocarbon-containing gas.

4. A process in accordance with claim 1, wherein said trialkyl arsine has the chemical formula of R$_3$As with each R being independently selected from the group consisting of alkyl groups containing 1-6 carbon atoms.

5. A process in accordance with claim 4, wherein said alkyl groups contain 1-3 carbon atoms per molecule.

6. A process in accordance with claim 1, wherein said feed is a gas, and said at least one trialkyl arsine is selected from the group consisting of trimethyl arsine, triethyl arsine, dimethyl ethyl arsine and diethyl methyl arsine.

7. A process in accordance with claim 1, wherein said feed contains about 1 ppb to about 0.1 weight-% of said at least one trialkyl arsine.

8. A process in accordance with claim 1, wherein said at least one gold component (a) is selected from the group consisting of gold metal, gold oxides, gold (III) nitrate, gold (III) sulfate, gold (I) chloride, gold (III) chloride, NH$_4$AuCl$_4$, gold (III) carboxylates, and mixtures thereof.

9. A process in accordance with claim 1, wherein said feed is a gas, and said at least one gold component (a) is selected from the group consisting of AuCl, AuCl$_3$, NH$_4$AuCl$_4$ and mixtures thereof.

10. A process in accordance with claim 1, wherein said inorganic support material (b) is selected from the group consisting of alumina, fluorided alumina, aluminum phosphate, silica, fluorided silica, aluminosilicates, titania, zirconia, hafnia, aluminates of zinc, aluminates of alkaline earth metals, titanates of zinc, titanates of alkaline earth metals, activated carbon, and mixtures thereof.

11. A process in accordance with claim 1, wherein said feed is a gas, and said inorganic support material (b) is selected from the group consisting of alumina, silica, and mixtures thereof.

12. A process in accordance with claim 1, wherein said feed is a gas, said gold component (a) contained in said solid sorbent material is selected from the group consisting of AuCl, AuCl$_3$, NH$_4$AuCl$_4$ and mixtures thereof, and said inorganic support material (b) contained in said solid sorbent material is selected from the group consisting of alumina, silica and mixtures thereof.

13. A process in accordance with claim 12 wherein said contacting is carried out under such conditions as to detect the presence of trialkyl arsine in said feed by a change of the color of said solid sorbent material from yellowish to violet-gray.

14. A process in accordance with claim 12, wherein said solid sorbent material contains about 0.1-25 weight-% Au.

15. A process in accordance with claim 12, wherein said solid sorbent material contains about 0.5-15 weight-% Au.

16. A process in accordance with claim 1, wherein said feed is a gas, and said contacting conditions comprise a temperature in the range of from about $-20°$ to $100°$ C.

17. A process in accordance with claim 1, wherein said feed is a gas, and said contacting is carried out in a contacting zone containing said solid sorbent material in a fixed bed.

18. A process in accordance with claim 1, wherein said feed is a gas which additionally contains at least one of H$_2$S and AsH$_3$.

19. A process in accordance with claim 18 comprising the additional step of contacting said feed with a guard bed material, which substantially absorbs said at least one of H$_2$S and AsH$_3$, before said contacting of said feed with said sorbent material comprising (a) at least one gold component and (b) an inorganic support material.

20. A process in accordance with claim 19, wherein said at least one gold component (a) is selected from the group consisting of AuCl, AuCl$_3$, NH$_4$AuCl$_4$ and mixtures thereof; said inorganic support material (b) is selected from the group consisting of alumina, silica, and alumina-silica mixtures; and said guard bed material is selected from the group consisting of PbO/Al$_2$O$_3$ and CuO/ZnO-containing materials.

21. A process in accordance with claim 20, wherein said guard bed material is PbO/Al$_2$O$_3$, and said contacting is carried out under such conditions as to detect the presence of trialkyl arsine in said feed by a change of the color of said solid sorbent material from yellowish to violet-gray.

* * * * *

UNITED STATES PATENT AND TRADEMARK OFFICE
CERTIFICATE OF CORRECTION

PATENT NO. : 4,971,608

DATED : November 20, 1990

INVENTOR(S) : Patricia A. Tooley and Gerhard P. Nowack

It is certified that error appears in the above-identified patent and that said Letters Patent is hereby corrected as shown below:

Claim 5, column 5, line 53, delete "per molecule".

Signed and Sealed this

Seventh Day of April, 1992

Attest:

HARRY F. MANBECK, JR.

*Attesting Officer*  *Commissioner of Patents and Trademarks*